(12) United States Patent
Waddell (10) Patent No.: US 6,425,714 B1
(45) Date of Patent: Jul. 30, 2002

(54) SYSTEM AND METHOD FOR CONVEYING LOOSE MATERIAL

(75) Inventor: Leo Waddell, Tacoma, WA (US)

(73) Assignee: Dirt Machine Partners, Seattle, WA (US)

( * ) Notice: Subject to any disclaimer, the term of this patent is extended or adjusted under 35 U.S.C. 154(b) by 0 days.

(21) Appl. No.: 09/782,903

(22) Filed: Feb. 13, 2001

(51) Int. Cl.[7] ............................................... B65G 53/44
(52) U.S. Cl. ............................ 406/81; 406/41; 406/145
(58) Field of Search ............................ 406/41, 79, 80, 406/81, 145

(56) References Cited

U.S. PATENT DOCUMENTS

| | | | | |
|---|---|---|---|---|
| 1,048,019 A | * | 12/1912 | Wilson | 406/80 |
| 1,069,308 A | * | 8/1913 | Wilson | 406/80 |
| 2,985,486 A | * | 5/1961 | Mortensen | 302/49 |
| 5,062,741 A | * | 11/1991 | Pirovano | 406/76 |
| 5,181,804 A | | 1/1993 | Wysong et al. | 406/67 |
| 5,186,312 A | | 2/1993 | Ambs et al. | 198/716 |
| 5,341,919 A | | 8/1994 | Mizuno | 198/716 |
| 5,556,237 A | | 9/1996 | Rexius | 406/32 |

* cited by examiner

Primary Examiner—Christopher P. Ellis
Assistant Examiner—Joe Dillon, Jr.
(74) Attorney, Agent, or Firm—SEED IP Law Group PLLC (57) ABSTRACT

Apparatus, systems and methods for conveying loose material are shown and described. In one embodiment, a plurality of spaced apart, interconnected conveyor elements entrap and move loose material through a hollow conduit having a fixed size and shape, and past a delivery location where high-pressure air enters one hole through the wall of the conduit and a fluidized mixture of high-pressure air and the loose material exits a separate, second hole in the conduit, carrying the loose material at a high rate of speed and a high velocity to a remote location. In a second embodiment, the system is moveably attached to a trailer to rotate between a traveling configuration and an operative configuration to facilitate mobility and operability of the above system.

17 Claims, 6 Drawing Sheets

SYSTEM AND METHOD FOR CONVEYING LOOSE MATERIAL

TECHNICAL FIELD

The present invention relates to apparatus, systems and methods for conveying quantities of loose material to a remote location.

BACKGROUND OF THE INVENTION

Loose material, such as excavation dirt, soil mixtures, grains, bark, gravel and mulch, are often transported between a storage location, a truck or other transport device, and/or a work site using heavy equipment such as front loaders and dump trucks. Heavy equipment, however, typically must be transported to and from a location on a road, and requires a relatively flat surface on which to operate. Where no road exists, where there is otherwise restricted access, or where the terrain is not suitable for operating heavy equipment, workers often resort to using shovels and wheelbarrows for moving loose material. For obvious reasons, shovels and wheelbarrows are not an optimal means for conveying large quantities of loose material, even over short distances.

Systems incorporating conveyor belts or fans have been developed to convey loose material from a work site or truck to a remote road or other area. Two systems that incorporate fans can be seen at U.S. Pat. No. 5,181,804 to Wysong et al. and U.S. Pat. No. 5,556,237 to Rexius.

Conveyor belts can be useful in situations where a large amount of loose material must be conveyed over a long distance, even over steep or uneven terrain. Conveyor belts, however, are bulky, complicated and difficult to set up. Consequently, conveyor belts may not be economical for small jobs or other short-term work.

As illustrated in the above-referenced patents, known blower systems can be extremely large and cumbersome. Accordingly, these systems require road access similar to heavy equipment. In addition, because blower systems use low pressure air to convey the loose material, the blower systems typically can only convey material over short distances (i.e., 250 ft. or less).

With respect to one particular application, i.e., erosion control on a hillside, the above methods prove to be particularly unsuited. Because erosion control problems are most commonly found on steep hillsides, often none of the heavy equipment or truck mounted equipment can get close to the work area. Belt conveyors and wheelbarrows can be used to convey the loose material to the site, but depositing the material in an effective manner is arduous work. The worker depositing the materials from the wheelbarrow or from the pile at the end of the belt conveyor must shovel the material into the proper location and compact the material to prevent it from eroding itself.

Similarly, blowers are ineffective at properly depositing the loose materials due to the low pressure air used to convey the material. The material exiting the distal end of the blower hose merely falls against the hillside. Consequently, after depositing the material with the blower hose, the worker must still manually compact the material against the hillside.

SUMMARY OF THE INVENTION

The present invention relates to apparatus, systems and methods for conveying loose material between two locations, such as a truck or trailer and either a work site or a storage location. In one embodiment, the apparatus comprises a hollow conduit made from a rigid material and having a fixed size and shape, and a mechanical conveyor having a plurality of spaced apart, interconnected conveyor elements that entrap the loose material and move it along a material path. The hollow conduit extends along a portion of the material path, and the conveyor elements—and with them the loose material—pass through the conduit. At a delivery location along the length of the conduit, a first hole through the wall of the conduit is adapted to communicate with a source of high pressure air, and a second opening through the wall of the conduit is sized and shaped to allow the loose material in a fluent state to pass therethrough. When the mechanical conveyor moves loose material to the delivery location, the high pressure air entering the conduit through the first opening fluidizes the loose material and carries it out the second opening. The second opening is adapted to be connected to a hose for carrying the fluidized loose material to a remote location at a high rate of speed. As the mechanical conveyor continues to transport loose material through the conduit, the loose material continues to be fluidized and transported along the hose to the remote location.

In another embodiment of the present invention, the mechanical conveyor and conduit described above are incorporated into a system comprising a hopper. The mechanical conveyor communicates with the hopper to convey large quantities of loose material to the conduit for substantially constant delivery to the remote location.

In yet another embodiment of the present invention, the hopper, mechanical conveyor and conduit described above are fixedly coupled to a first frame assembly. The first frame assembly is then movably coupled to a second frame assembly. The second frame assembly can be configured for transport, such as on a truck or trailer. The first frame assembly moves with respect to the second frame assembly between a first position for non-use and/or transport, and a second position for operation.

DETAILED DESCRIPTION OF THE INVENTION

The present invention is generally directed toward apparatus, systems and methods for conveying loose material. Many specific details of certain embodiments of the invention are set forth in the following description and in FIGS. 1–6 to provide a thorough understanding of such embodiments. One skilled in the art, however, will understand that the present invention may have additional embodiments, or may be practiced without several of the details described in the following description.

Figure 1:
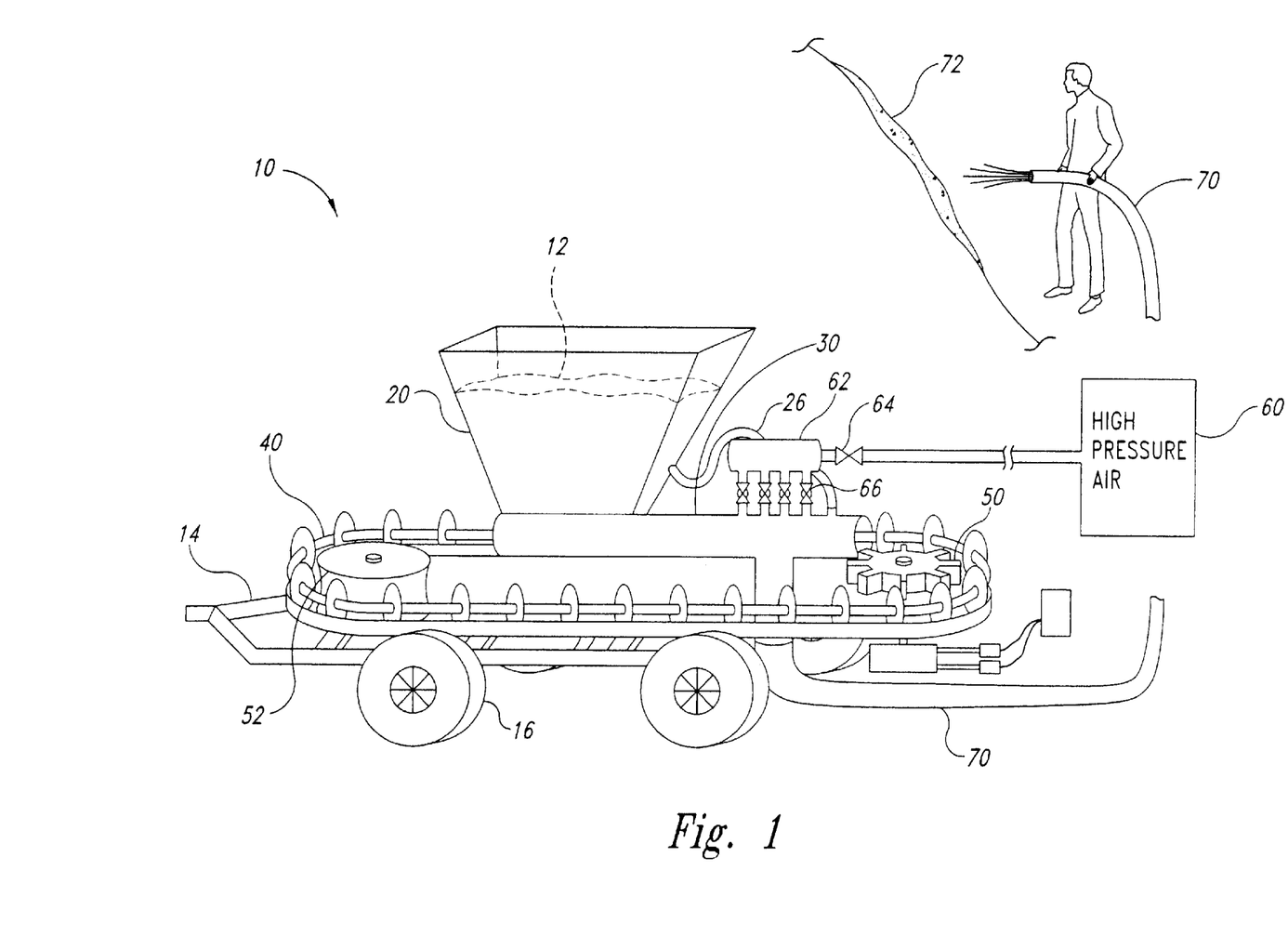
FIG. 1 is an isometric view schematically illustrating a system for conveying loose material according to an embodiment of the present invention.

FIG. 1 illustrates a material conveyance system 10 according to one particular embodiment of the present invention. The material conveyance system 10 generally incorporates a hopper 20, a compression tube 30, a conveyor belt 40, an air compressor 60 and a delivery hose 70. The hopper 20 is configured to retain a quantity of loose material 12 for introduction into the material conveyance system 10. In the illustrated embodiment, the hopper 20 has a generally rectangular cross-section as viewed from above, and is tapered from top to bottom such that the cross-section at the top is larger than that at the bottom. The hopper 20 is positioned on top of the compression tube 30 to allow the loose material 12 to enter the compression tube 30 from the hopper 20.

Figure 2:
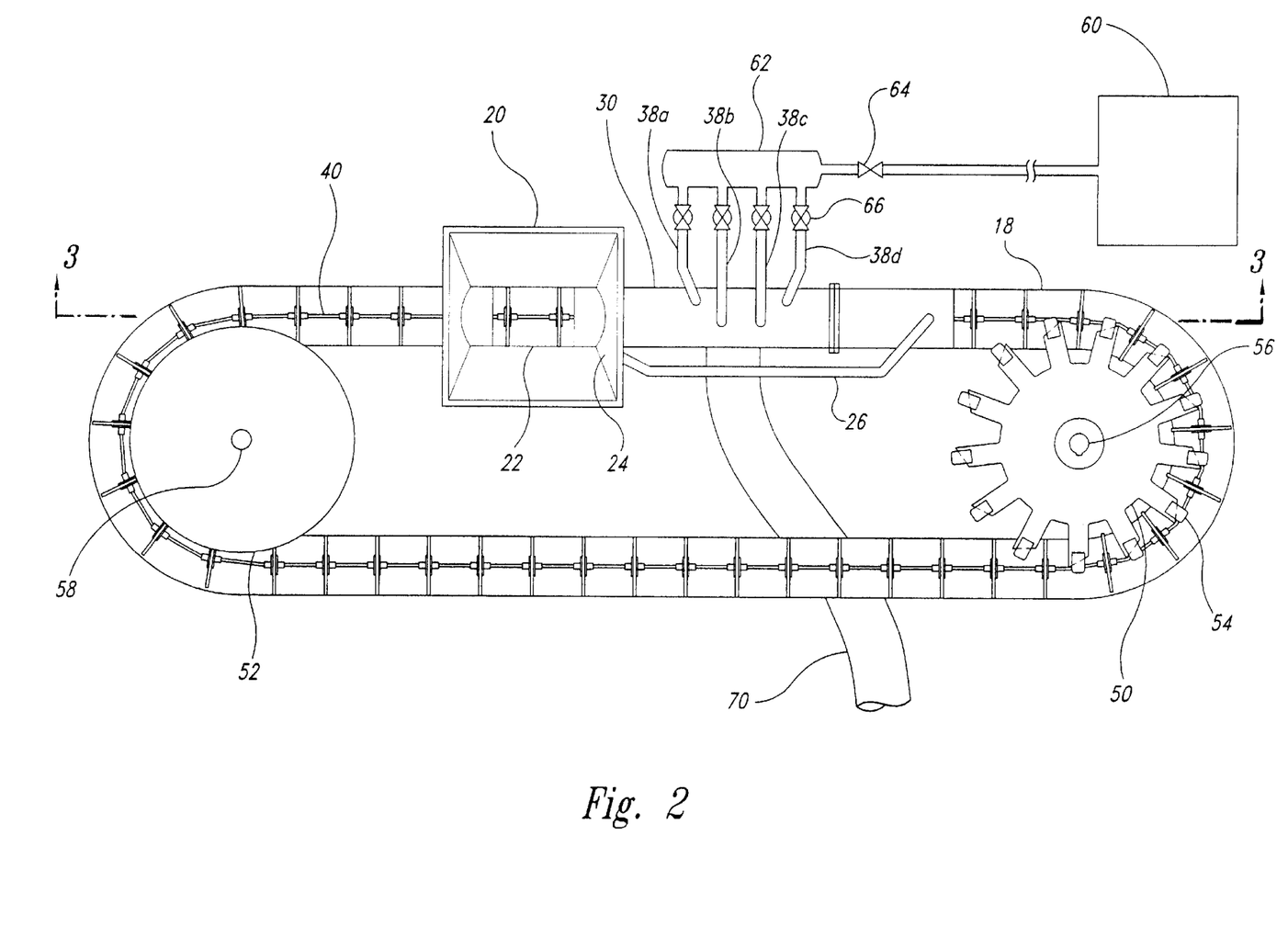
FIG. 2 is a plan view schematically illustrating a portion of the system for conveying loose material of FIG. 1.
Figure 3:
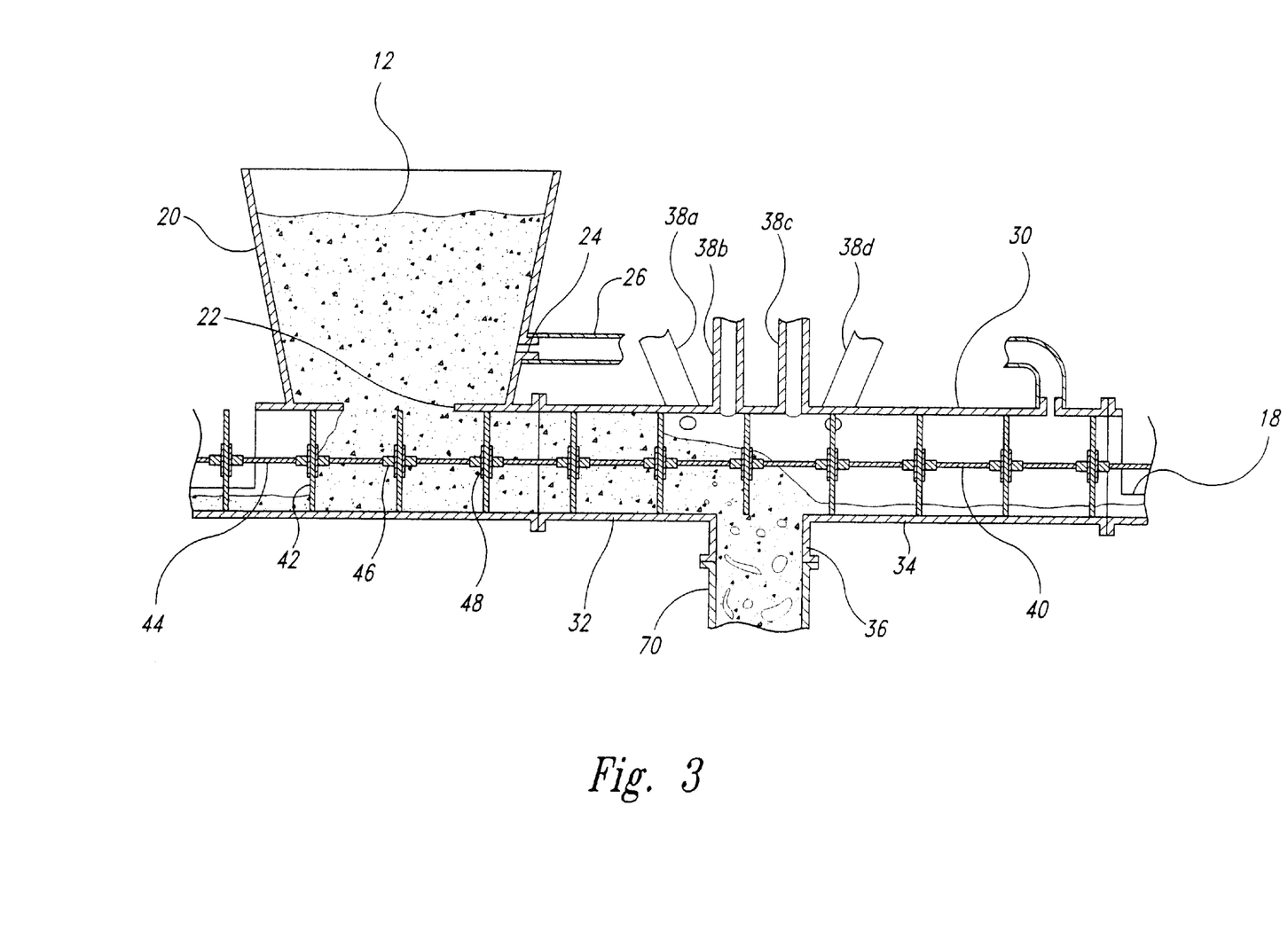
FIG. 3 is a sectional view of a portion of the system for conveying loose material of FIG. 2, viewed along Section 3—3.

As best illustrated in FIGS. 2 and 3, an opening 22 is located in the bottom of hopper 20 to allow loose material 12 (not shown in FIG. 2 for clarity) to pass from the hopper 20 to the compression tube 30. In the illustrated embodiment, the lower portion of the hopper 20 is actually saddled onto a pipe extending from the compression tube 30, and accordingly, the opening 22 is cut into the extending pipe. The size, shape and orientation of the hopper 20 and the compression tube 30, however, can vary dramatically without diverging from the spirit of the present invention.

A hole 24 is positioned in a wall of the hopper 20 to allow air to be introduced into the hopper to fluff the loose material 12, if desired. The hole 24 is connected by tubing 26 to the compression tube 30 in the illustrated embodiment. Thus, pressurized air in the compression tube 30 that does not exit through the delivery hose 70 passes from the compression tube 30, through the tubing 26 and into the hopper 20 through the hole 24. The hole 24 could similarly be connected to an air compressor or blower, or otherwise configured to introduce air into the hopper 20.

As best illustrated in FIG. 3, the compression tube 30 comprises a first arm 32, a second arm 34 and a leg 36. In the illustrated embodiment, the compression tube 30 is fabricated from a 6×6 piping "T." The compression tube 30 can be manufactured from any rigid material suitable for the conditions discussed below, such as carbon steel, stainless steel, alloys, or other materials with similar characteristics. In the illustrated embodiment, the compression tube 30 is fabricated from steel, and is lined on its interior surface with chrome. The size of the compression tube 30 can vary, as can the relative sizes of the first and second arms 32/34 with respect to the leg 36. For example, the compression tube 30 can be fabricated from a 4×4 T, a 6×4 T, an 8×6 T, an 8×8 T, or a wide variety of other variations. Likewise, the compression tube 30 can have flanged ends, welded ends, or can otherwise be configured for attachment into the system as discussed herein.

Four inlets 38a/38b/38c/38d are located along the length of the first and second arms 32/34 of the compression tube 30. In the illustrated embodiment, the inlets 38a/38b/38c/38d are staggered along the compression tube 30, both longitudinally and radially. The centermost inlets 38b/38c are positioned roughly opposite the leg 36 of the compression tube 30. The outside inlets 38a/38d are located outside the width of the leg 36 along first arm 32 and second arm 34, respectively, and are angled toward the leg. In the illustrated embodiment, the inlets 38a/38b/38c/38d are fabricated from one inch pipe welded to the compression tube 30. The inventor appreciates, however, that the inlets 38a/38b/38c/38d can be attached to the compression tube 30 by threaded nipples, flanges, or by any other structure generally known in the art. The inlets 38a/38b/38c/38d can be fabricated from metal or other suitable materials, as generally understood in the art.

As best illustrated in FIG. 3, the conveyor belt 40 consists of a number of resilient disks 42 connected to a flexible cable 44. At the location where the disks 42 are fixed to the cable 44, a stabilizer 46 retains the disks 42 in the proper alignment, and a plate 48 reinforces the strength of the disks 42. In the illustrated embodiment, the disks 42 are fabricated from a strong, resilient polymer, and the cable 44 is fabricated from a strand of flexible steel cable wrapped in a polymer sheet. The disks 42 are cylindrical and sized to fit closely within the compression tube 30. It is understood, however, that the size and shape of the disks 42 can change to correspond with the size and shape of the compression tube 30. For example, if the compression tube 30 were square conduit instead of tubular pipe, the disks 42 could instead be square sheets of resilient material sized and shaped to contact the walls of the conduit.

As illustrated in FIG. 2, the conveyor belt 40 is connected in a continuous. loop with one end wrapped around a gear 50 and the other wrapped around a pulley 52. The gear 50 has a number of teeth 54 configured to engage the disks 42 on the conveyor belt 40, and to drive the conveyor belt 40 during operation. A drive shaft 56 at the center of the gear 50 is engaged with a hydraulic or other motor (FIG. 1) to rotate the gear 50. A rotating shaft 58 at the center of pulley 52 is engaged with bearings to allow the pulley 52 to rotate freely in response to movement of the conveyor belt 40 under the power of the gear 50. The relative positioning of the gear 50 and the pulley 52 retains the conveyor belt 40 in a taut state.

As described briefly above, a portion of the conveyor belt 40 passes through the hopper 20 under the opening 22. Also, a portion of the conveyor belt 40 passes through the first and second arms 32/34 of the compression tube 30. In the illustrated embodiment, the compression tube 30 is butted against the hopper 20. It is understood, however, that the relative positioning of the compression tube 30 with respect to the hopper 20 can be varied without diverging from the spirit of the present invention.

An air compressor 60 is coupled to the inlets 38a/38b/38c/38d by a high-pressure air header 62. A first valve 64 positioned between the air compressor 60 and the header 62 can be manipulated to isolate the header 62 from the air compressor 60. Between the header 62 and the compression tube 30, each of the inlets 38a/38b/38c/38d is fitted with a second valve 66. The second valves 66 can be manipulated to adjust the flow of air between the header 62 and the respective inlet 38a/38b/38c/38d. By selectively adjusting each of the second valves 66, the various inlets can have four distinct flow rates, or can be adjusted to have the same flow rate.

The delivery hose 70 is coupled to the leg 36 of the compression tube 30. In the illustrated embodiment, the delivery hose 70 is a four inch, flexible hose configured to direct the fluidized loose material 12 exiting the leg 36 of the compression chamber 30 to a deposition site 72 (FIG. 1). The delivery hose 70 can be of larger or smaller diameter, and can be connected to the leg 36 directly or with a reducer. The delivery hose 70 can be attached to the leg 36 by any suitable manner known in the art.

During operation, the material conveyance system 10 is transported to a job site, such as by trailing the system on a trailer 14 having wheels 16. The hopper 20 is then filled with loose material 12, such as by shovel or front loader, and the air compressor 60 is activated to begin flowing high-pressure air through one or more of the inlets 38a/38b/38c/38d in the compression tube 30. The conveyor belt 40 is then turned on to drive the disks 42 through the hopper 20 and the compression tube 30 before returning again to the hopper 20. As best illustrated in FIG. 3, as the cable 44 pulls the disks 42 past the hopper 20, the loose material 12 in the hopper 20 passes through the opening 22 to be trapped between a pair of adjacent disks 42. As the disks 42 continue to move from the hopper 20 to the compression tube 30, the loose material 12 between a particular pair of disks 42 first encounters inlet 38a and leg 36. The high-pressure air entering the compression tube 30 through inlet 38a begins to fluidize the loose material 12 and force it through the leg 36 into the delivery hose 70. As the pair of disks 42 continues along its constant path, it sequentially passes central inlets 38b and 38c. These central inlets 38b/38c force the majority of the loose material 12 out the leg 36 and down the delivery hose 70. Finally, before the pair of disks 42 passes the leg 36, a final inlet 38d forces substantially all of the remaining loose material 12 through the leg 36 and into the delivery hose 70.

After the pair of disks 42 has passed the leg 36, a residual amount of pressurized air remains between the disks. This residual pressurized air passes through tubing 26 and into hopper 20 to fluff the loose material 12, as discussed briefly above.

In the illustrated embodiment, a trough 18 extends around the remaining portion of the conveyor belt 40 to return any remaining loose material 12 not expressed through the delivery hose 70 back to hopper 20 for recycling.

Because the compression tube 30 is made from rigid material, the engagement between the conveyor belt 40 and the compression tube 30 can be designed such that no air escapes from the system 10 other than through the delivery hose 70. Consequently, the system 10 can be highly efficient, while not requiring any adjustment as necessary in the prior art. Once the disks 42 wear down to a point where they can no longer retain a sufficient seal, the conveyor belt 40 can be removed from the gear 50 and pulley 52, and can be quickly and easily replaced with a new conveyor belt. Because the new conveyor belt has disks 42 of a known size to correspond with the fixed size of the compression tube 30, the user can be assured that the new disks will create the proper seal when passing through the compression tube, again without the need for adjustment.

Figure 4:
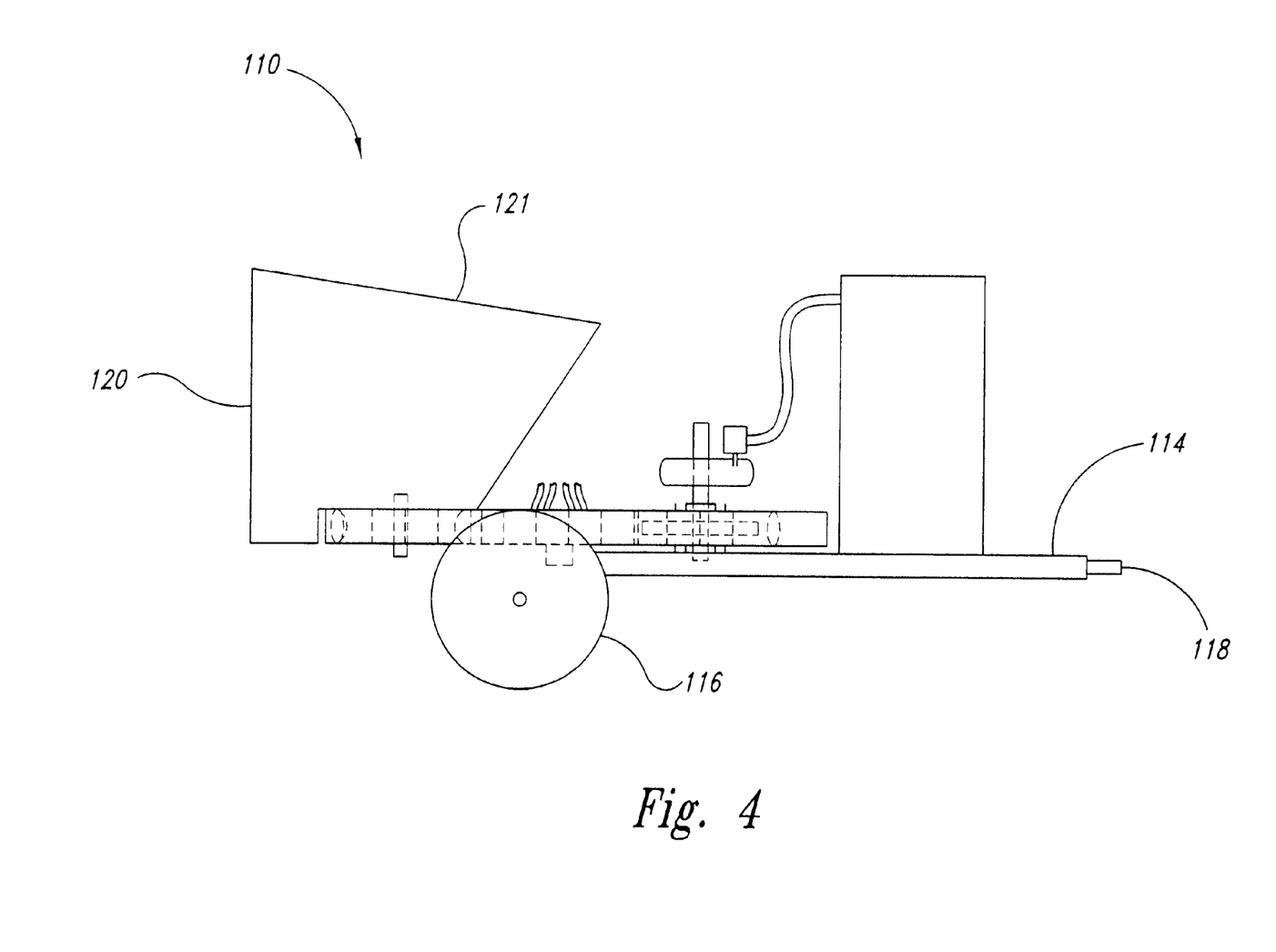
FIG. 4 is an elevation view schematically illustrating a system for conveying loose material according to another embodiment of the present invention.
Figure 5:
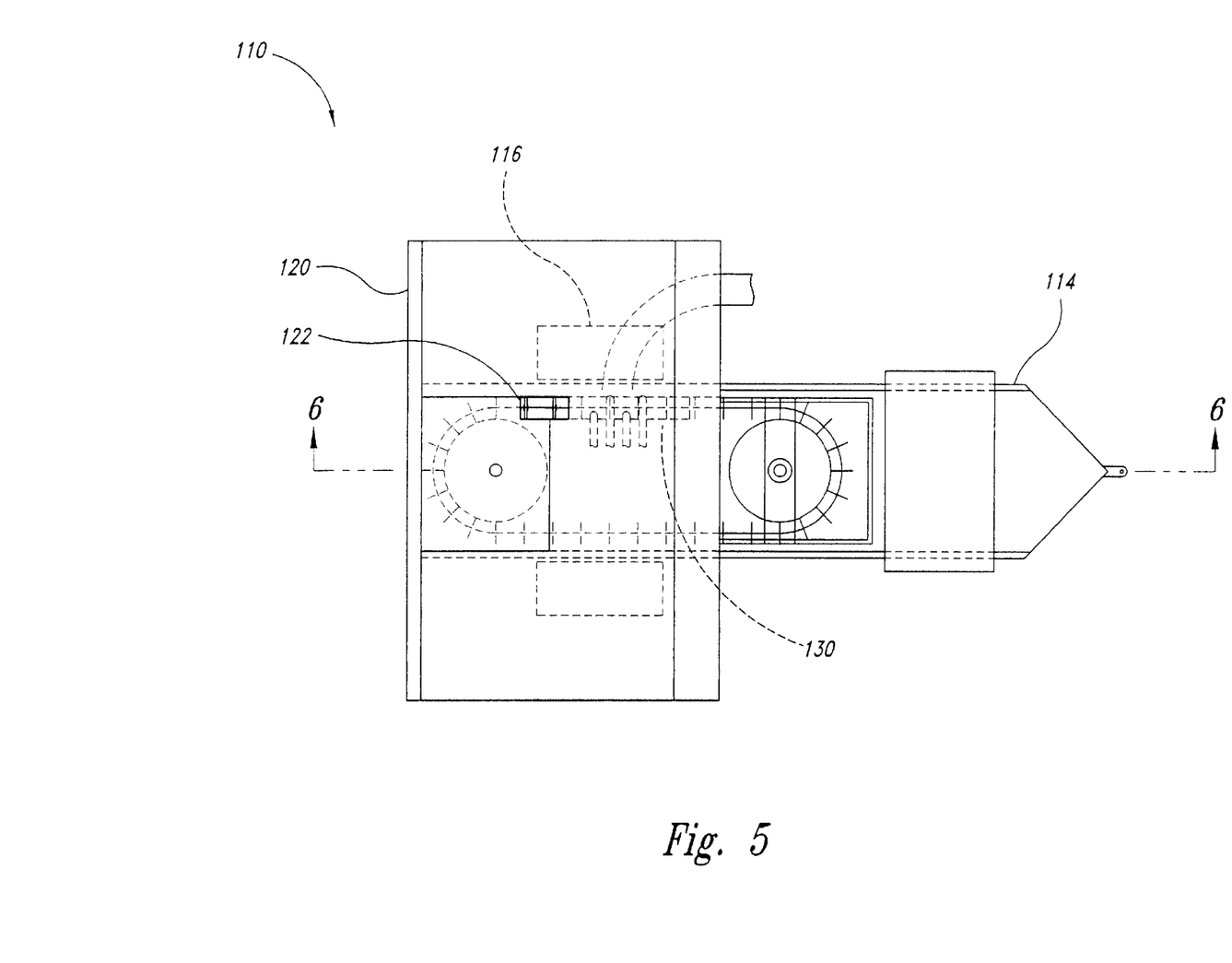
FIG. 5 is a plan view of the system for conveying loose material of FIG. 4.
Figure 6:
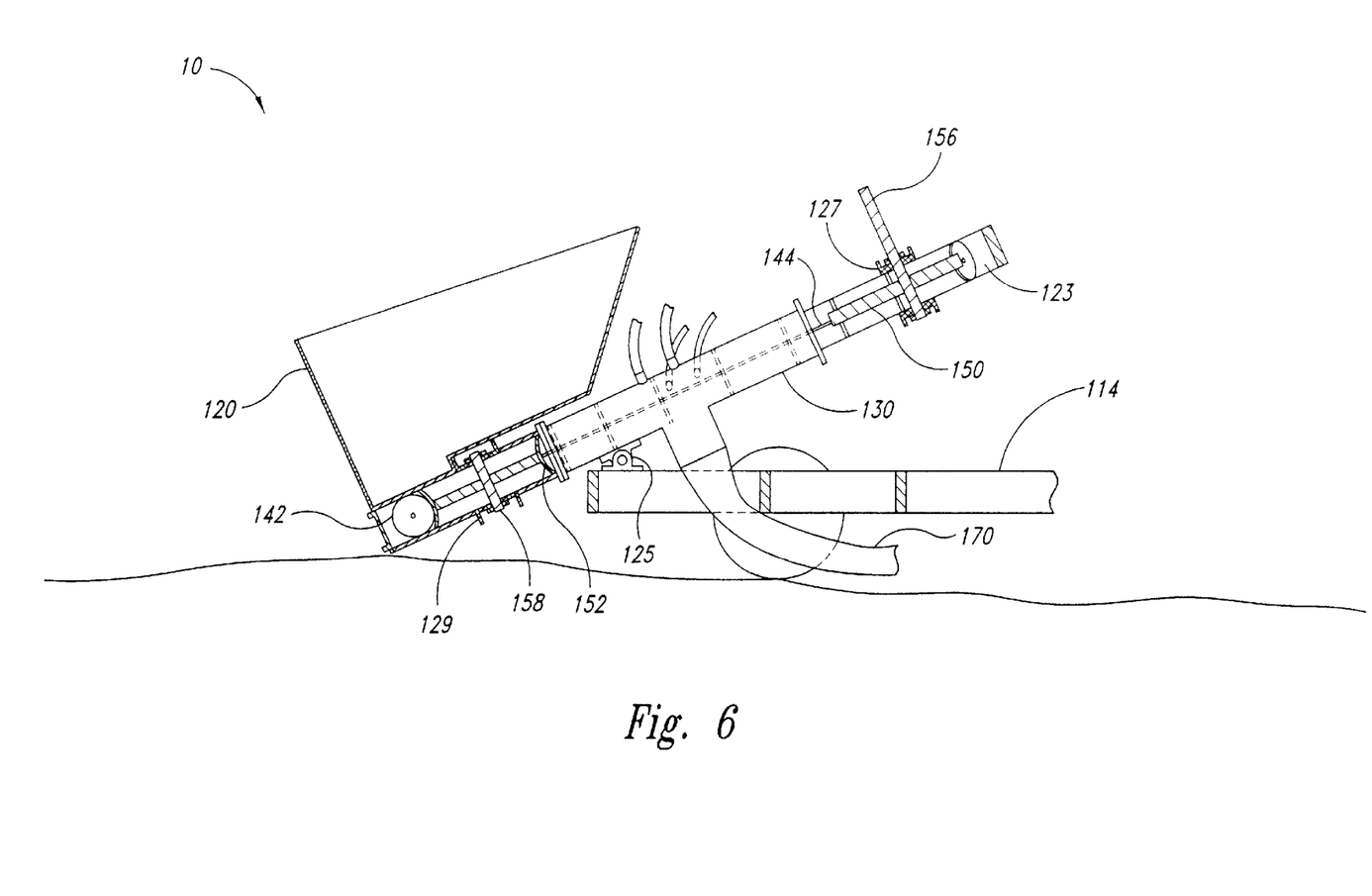
FIG. 6 is a sectional view of the system for conveying loose material of FIG. 5, viewed along Section 6—6.

FIGS. 4-6 illustrate a material conveyance system 110 according to another embodiment of the present invention. The material conveyance system 110 is in many ways the same as the material conveyance system 10 described above, except for the distinctions discussed below. Consequently, any details not conflicting with the description of the above embodiment, as well as any omissions, can be assumed to be the same as that described above.

In this particular embodiment, a hopper 120 is positioned at an extreme end of a trailer 114 opposite a hook-up 118 for connection to a towing vehicle (not shown). Accordingly, the hopper 120 can be filled and the material conveyance system 110 operated without removing the trailer 114 from the tow vehicle.

As illustrated in FIG. 4, the material conveyance system 110 is configured for traveling or long-term storage. As illustrated in FIG. 6, the material conveyance system 110 is configured for operation. When traveling, the hopper 120 is raised above the ground to minimize obstructions to travel.

During operation, a frame 123, to which a hopper 120 is attached, pivots with respect to a trailer 114 until the hopper 120 and/or the frame 123 contacts the ground.

The operating parts of the material conveyance system 110 are attached to the frame 123 to pivot therewith about a hinge 125 between the traveling position and the operating position. As best illustrated in FIG. 6, a gear 150 and a drive shaft 156 are attached by a pair of opposing frame members 127 to the frame 123. Similarly, a pulley 152 and a rotating shaft 158 are attached by a pair of structural members 129 to the frame 123. The compression tube 130 is similarly fixed to the frame 123.

In the traveling configuration illustrated in FIG. 4, the hopper 120 and other functioning elements of the material conveyance system 110 are rotated forward onto the trailer 114 so as not to obstruct the trailer's ability to travel. When configured in the operating position, on the other hand, as illustrated in FIG. 6, the functioning portions of the material conveyance system 110 are rotated upward and/or backward, away from the trailer 114 to position the hopper 120 in a more convenient position for being filled. In this position, a delivery hose 170 can be coupled to the compression tube 130, and the material conveyance system 110 can be operated substantially the same as described above to deliver loose material to a deposition site.

Similar to that described above, an opening 122 (FIG. 5) in the base of the hopper 120 passes between the hopper 120 and an extension of the compression tube 130 to allow loose material to pass from the hopper 120 to the conveyer belt 140 and, in turn, to the compression tube 130.

Because each of the above embodiments is specifically designed to operate with high-pressure air, i.e., air at pressures greater than 40 psi, the systems can deliver loose materials to locations significantly further than any material conveyance systems of the prior art. In addition, because of the energy generated in the combustion tube of the present invention, the loose material can be delivered at a velocity high enough to deposit the materials with force. As a result, when used for erosion control purposes, for example, the system compresses soil or soil mixtures against a hillside. Therefore, deposition of soil mixtures for erosion control purposes using the present invention may eliminate the step of compacting the soil with a shovel or similar means. Still further, the high pressure and high energy of the present invention allows loose material to be delivered to a location more than 1,000 feet from the hopper. This distance is substantially greater than any known system of the prior art.

This system can deliver loose materials through steep, rough and uneven terrain, and can therefore be used in substantially any situation.

The material conveyance systems discussed above can be used to deliver materials to a work site, such as for erosion control as discussed above, or can be used to deliver materials from a particular site, such as removal of excavation materials, or delivery of grains or other commodities from a silo to a truck.

From the foregoing it will be appreciated that, although specific embodiments of the invention have been described herein for purposes of illustration, various modifications may be made without deviating from the spirit and scope of the invention. Accordingly, the invention is not limited except as by the appended claims.

I claim:

1. An apparatus for use in combination with a hopper and a mechanical conveyor to convey loose material from the hopper to a remote location, the mechanical conveyor having a plurality of spaced-apart, interconnected conveyor elements, the conveyor elements each having a resilient external edge with a consistent unstressed shape, the mechanical conveyor being configured to move the loose material from the hopper along a material path, the loose material being entrapped between the conveyor elements, the apparatus comprising:

a hollow conduit having a substantially continuous wall extending along a length between openings at first and second ends of the conduit, the wall of the conduit being made from a rigid material and having a fixed size and shape, an internal surface of the wall being sized and shaped to allow the conveyor elements of the mechanical conveyor to pass along at least a portion of the material path through the conduit in an orientation in which the entire external edge of each of the conveyor elements therein is in close contact with the internal surface of the wall to form a seal retaining the loose material therebetween, a delivery location along the length of the conduit having a plurality of openings through the wall, the first opening being adapted to communicate with a source of high pressure air, the delivery location along the conduit also having a second opening through the wall, the second opening being sized and shaped to allow the loose material entrapped between the conveyor elements to flow therethrough in a fluent state with the high pressure air that enters the conduit through the first opening, the second opening being adapted to be coupled to a hose for delivering the loose material to the remote location.

2. The apparatus of claim 1 wherein the conduit is metal and the internal surface of the conduit is plated with chrome, the wall of the conduit is substantially cylindrical and the internal surface of the wall has a diameter slightly smaller than a diameter of the resilient external edge of the conveyor elements, the length of the conduit extends along a substantially linear path, and the delivery location is central along the length of the conduit.

3. The apparatus of claim 1 wherein the wall of the conduit is substantially cylindrical and the internal surface of the wall has a diameter slightly smaller than a diameter of the resilient external edge of the conveyor elements.

4. The apparatus of claim 1 wherein the delivery location is substantially central along the length of the conduit.

5. The apparatus of claim 1 wherein the conduit extends along a substantially linear path from the first end to the second end.

6. The apparatus of claim 1 wherein the said plurality of openings are comprises a plurality of first openings spaced apart in the proximity of the delivery location.

7. The apparatus of claim 1, further comprising a header for the high pressure air, the header being adapted to communicate with the source of high pressure air, and wherein a plurality of first openings communicate with the header.

8. The apparatus of claim 1 wherein the apparatus is in the form of a rigid tee, the arms of the tee forming the conduit and the leg of the tee forming the second opening.

9. The apparatus of claim 1 wherein the apparatus is in the form of a rigid reducing tee, the arms of the tee forming the conduit and the reduced-size leg of the tee forming the second opening.

10. The apparatus of claim 1 wherein the ends of the conduit have flanges fixed thereto.

11. A system for conveying loose material to a remote location, the system comprising:

a hopper;

a mechanical conveyor, the mechanical conveyor having a plurality of spaced-apart, interconnected conveyor elements, the conveyor elements each having a resilient external edge with a consistent unstressed shape, the mechanical conveyor communicating with the hopper to move the loose material from the hopper along a material path with the loose material entrapped between the conveyor elements; and a hollow conduit extending along at least a portion of the material path of the mechanical conveyor, the conduit having a substantially continuous wall extending along a conduit length between openings at first and second ends of the conduit, the wall of the conduit being made from a rigid material and having a fixed size and shape, an internal surface of the wall being sized and shaped to closely receive the conveyor elements of the mechanical conveyor in an orientation in which the entire external edge of each of the conveyor elements is in close contact with the internal surface of the wall to form a seal retaining the loose material therebetween, a delivery location along the length of the conduit having a plurality of openings through the wall, the first opening being adapted to communicate with a source of high pressure air, the delivery location along the conduit also having a second opening through the wall, the second opening being sized and shaped to allow the loose material entrapped between the conveyor elements to flow therethrough in a fluent state with the high pressure air that enters the conduit through the first opening, the second opening being adapted to be coupled to a hose for delivering the loose material to the remote location.

12. The system of claim 11 wherein the conduit is metal and the internal surface of the conduit is plated with chrome, the wall of the conduit is substantially cylindrical and the internal surface of the wall has a diameter slightly smaller than a diameter of the resilient external edge of the conveyor elements, the length of the conduit extends along a substantially linear path, the delivery location is central along the length of the conduit, and further comprising a plurality of wheels configured to facilitate movement of the system.

13. The system of claim 11 further comprising a plurality of wheels coupled to the system for facilitating transportation of the system.

14. The system of claim 11 further comprising a plurality of wheels coupled to the system for facilitating transportation of the system, and wherein the hopper is movably coupled to the system to move between a first position in which the hopper is configured to facilitate transportation of the system, and a second position in which the hopper is configured to facilitate filling of the hopper.

15. The system of claim 11 further comprising a header for the high pressure air, the header being adapted to communicate with the source of high pressure air, and wherein a plurality of first openings communicate with the header.

16. The system of claim 11 wherein the conduit is formed from the arms of a rigid tee and the leg of the tee forms the second opening.

17. The system of claim 11 wherein the conduit is formed from the arms of a rigid reducing tee and the leg of the reducing tee forms the second opening.

* * * * *